(12) United States Patent
Norimatsu et al.

(10) Patent No.: US 7,977,001 B2
(45) Date of Patent: Jul. 12, 2011

(54) ELECTRONIC EQUIPMENT WITH FUEL CELL-POWER SUPPLY UNIT

(75) Inventors: Yasuaki Norimatsu, Hitachinaka (JP); Akihiko Kanouda, Hitachinaka (JP); Mutsuml Kikuchi, Mito (JP)

(73) Assignee: Hitachi, Ltd., Tokyo (JP)

( * ) Notice: Subject to any disclaimer, the term of this patent is extended or adjusted under 35 U.S.C. 154(b) by 1240 days.

(21) Appl. No.: 11/514,929

(22) Filed: Sep. 5, 2006

(65) Prior Publication Data

US 2007/0059568 A1 Mar. 15, 2007

(30) Foreign Application Priority Data

Sep. 14, 2005 (JP) ................. 2005-266207

(51) Int. Cl.
*H01M 8/04* (2006.01)
*H01M 8/24* (2006.01)

(52) U.S. Cl. ........ 429/448; 429/449; 429/447; 429/443; 429/462; 429/428

(58) Field of Classification Search .................. 429/408, 429/428–463
See application file for complete search history.

(56) References Cited

U.S. PATENT DOCUMENTS

| | | | | |
|---|---|---|---|---|
| 7,297,426 B2 * | 11/2007 | Sakai et al. | .................. | 429/410 |
| 7,479,342 B2 | 1/2009 | Hasegawa et al. | | |
| 2001/0028970 A1 * | 10/2001 | Sano et al. | ....................... | 429/22 |
| 2004/0110046 A1 * | 6/2004 | Pan et al. | .......................... | 429/22 |
| 2005/0019641 A1 * | 1/2005 | Aoyama et al. | ................. | 429/34 |
| 2005/0164055 A1 * | 7/2005 | Hasegawa et al. | ............... | 429/22 |
| 2005/0238943 A1 * | 10/2005 | Akiyama et al. | ................ | 429/38 |

FOREIGN PATENT DOCUMENTS

| | | |
|---|---|---|
| JP | 2004-537150 | 12/2004 |
| JP | 2005-11633 | 1/2005 |
| WO | WO 03/012904 | 2/2003 |
| WO | WO 2004/066468 | 8/2004 |
| WO | WO 2004114450 A1 * | 12/2004 |
| WO | WO 2005004270 A1 * | 1/2005 |

\* cited by examiner

*Primary Examiner* — Dah-Wei D Yuan
*Assistant Examiner* — Edu E Enin-Okut
(74) *Attorney, Agent, or Firm* — Antonelli, Terry, Stout & Kraus, LLP.

(57) ABSTRACT

Fuel concentration near a power generator of a DMFC is adjusted by decreasing current taken from the DMFC when the concentration near the power generator of the DMFC is higher than an optimum value and increasing the current taken from the DMFC when the concentration near the power generator of the DMFC is lower than the optimum value. Since the fuel does not come into direct contact with the power generator in the DMFC in a portion from a cartridge to the power generator in the DMFC, drying of the fuel is suppressed. By providing an auxiliary tank capable of storing fuel, concentration of methanol supplied near the power generator of the DMFC is lowered upon activation after long-time storage.

12 Claims, 9 Drawing Sheets

ELECTRONIC EQUIPMENT WITH FUEL CELL-POWER SUPPLY UNIT

CLAIM OF PRIORITY

The present application claims priority from Japanese application serial No. 2005-266207, filed on Sep. 14, 2005, the content of which is hereby incorporated by reference into this application.

FIELD OF THE INVENTION

The present invention relates to electronic equipment with power supply unit using a fuel cell.

BACKGROUND OF THE INVENTION

As a recent electronic technology progresses, portable electronic equipment such as a cellular phone, a notebook-sized PC, audio/visual equipment, and mobile terminal equipment rapidly comes into proliferation. Such portable electronic equipment is conventionally driven with a secondary battery. New-type secondary batteries replace exiting models while achieving a downsizing and reduction in weight, and increasing in energy density. For example, the secondary cell has been developed as a sealed lead battery, an Ni—Cd battery, a nickel hydrogen battery, and a lithium ton battery. In any of the secondary batteries, battery active materials and a larger-capacity battery structure are being developed to increase the energy density, and efforts are made to realize a power supply of longer use time.

Although efforts to realize lower power consumption are being made in portable electronic equipment, as new functions thereof are continuously added to respond to customer's needs, it is expected that total power consumption of portable equipment is increasing from now on. Consequently, there is a trend toward a higher-density power supply, that is, a power supply of longer continuous use time.

Expectations for a power supply unit using a fuel cell to assure longer use time of a portable equipment for the user are rising. As the fuel cell for the portable equipment, a direct methanol fuel cell (hereinbelow, DFMC) is regarded as a promising fuel cell since it can generate power even at room temperature. Different from the existing secondary batteries, the aim of the DFMC is to enable continuous power generation by supplying a fuel with a cartridge or the like.

To reliably perform continuous power generation, the concentration of methanol has to be controlled.
Reference: Translated National Publication of Patent Application No. 2004-537150

When a power supply unit with a DMFC is continuously used, the fuel concentration in a fuel storing mechanism (hereinbelow, called fuel tank) capable of storing a necessary amount of fuel near a power generating part of the DMFC changes. When the methanol concentration in the fuel which is in contact lies out from a predetermined range, drop in an output of the power generating part in the DMFC becomes large.

An object of the present invention is to stabilize an output of a power supply unit by controlling a fuel concentration in a fuel tank so as not to be out of a predetermined range.

SUMMARY OF THE INVENTION

The present invention provides a fuel cell-power supply unit comprising: a power generation section with an anode electrode for oxidizing a fuel, a cathode electrode for reducing oxygen and a solid polymer electrolyte membrane provided between the anode electrode and the cathode electrode; a fuel tank for feeding the fuel in a solution state to the anode electrode; and a concentration sensing device for sensing a concentration of the fuel in the solution.

The fuel concentration can be controlled by sensing the concentration of the fuel. As a result, an output of the power supply unit can be stabilized.

DETAILED DESCRIPTION OF THE PREFERRED EMBODIMENTS OF THE INVENTION

The details of the configuration of a fuel cell-power supply unit of the present invention and a method of controlling the same will be described hereinbelow by using embodiments and the drawings.

First Embodiment

Figure 1:
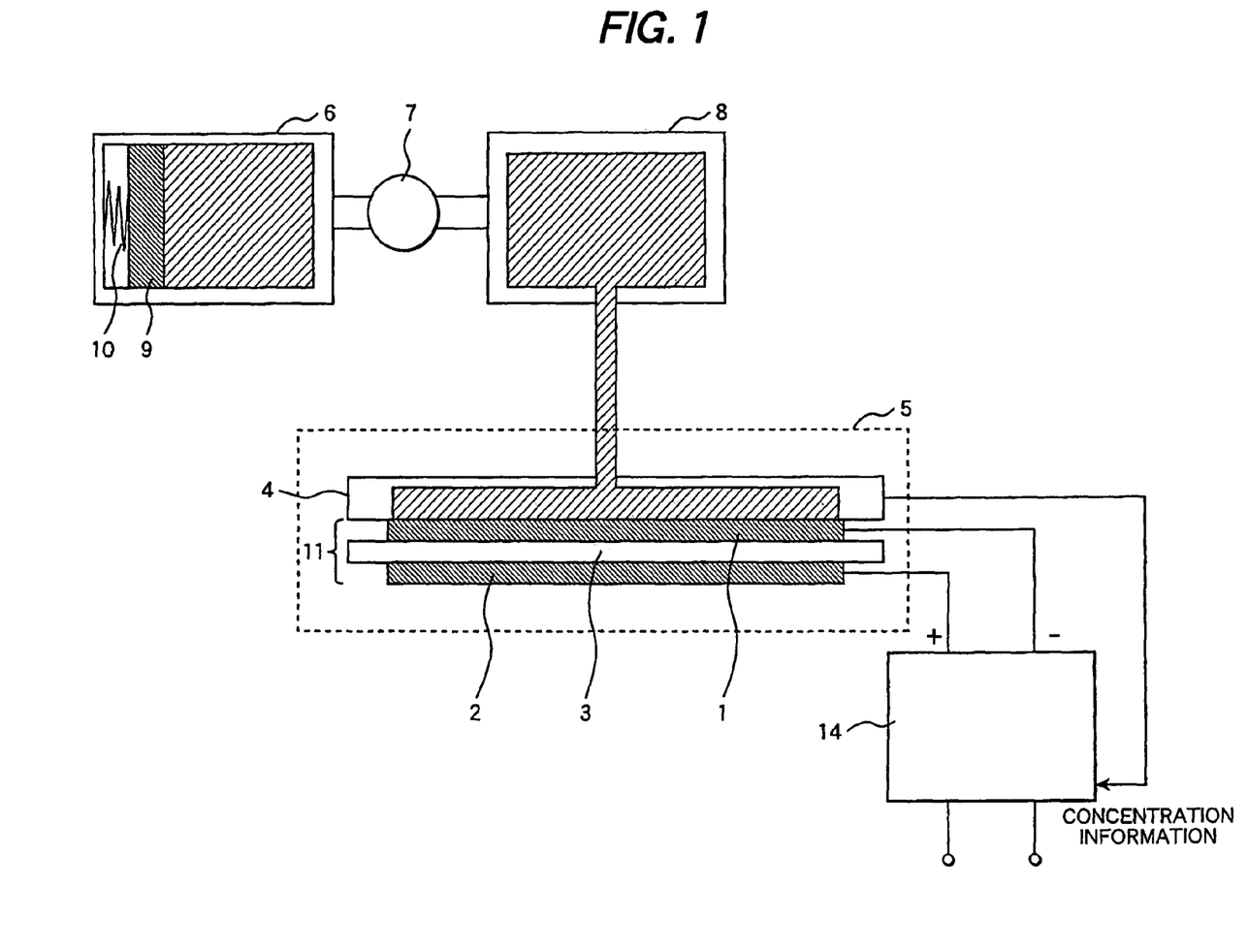
FIG. 1 shows the configuration in a first embodiment of the present invention.

A first embodiment of the present invention will be described by using FIG. 1.

A fuel cell-power supply unit of the first embodiment is mainly constructed with a DMFC 5. The DMFC 5 comprises a power generation section 11 and a fuel tank section 4. The power generation section 4 comprises a membrane electrode assembly (hereinafter, MEA) with an anode electrode 1 for oxidizing methanol as a fuel, a cathode electrode 2 for reducing oxygen, and a solid polymer electrolyte membrane 3 provided between the anode electrode and the cathode electrode, a current collector (not shown) for collecting current from the MEA, and an end plates (not shown) for holding the MEA and the current collector. The fuel tank section 4 is can store methanol solution in contact with the anode electrode side of the MEA. The power supply unit also includes an auxiliary tank 8 and a control system 14 and, as necessary, a capacitor, a protection circuit, and a DC/DC converter which will be described later.

Fuel is replenished from a detachable fuel cartridge 6 to the fuel tank 4, via a cartridge check valve 7, the auxiliary tank 8. The cartridge check valve checks leakage of the fuel to the cartridge 6 side, and the auxiliary tank 8 temporarily stores the fuel. The cartridge 6 has therein a piston 9 which pushes the fuel by reaction force from a spring 10.

The electric system is constructed in such a manner that the anode electrode 1 and the cathode electrode 2 are electrically connected to the control system 14, and fuel concentration information of the fuel tank 4 is input to the control system 14.

A control mechanism for controlling the fuel concentration so that the DMFC operates in a range where it can generate power in good condition at the time of continuous use will be described. In a passive type using no auxiliary device, as the fuel concentration can not be positively controlled by the passage of the fuel through the fuel tank, a mechanism for adjusting the fuel concentration near the anode aside in place of the passage is necessary. Also in an active type using an auxiliary device, the mechanism is also necessary to adjust concentration near the anode electrode.

Since methanol solution is used as the fuel in the embodiment, the concentration of the fuel denotes the methanol concentration in the methanol solution. There are four major causes of changing the methanol concentration in the fuel tank. The first cause is consumption of the fuel by a chemical reaction accompanying power generation of the fuel cell. The second cause is a crossover phenomenon that methanol and water pass through the electrolyte membrane and reach the cathode electrode. The third cause is volatilization of methanol and water. The fourth cause is accompanying water which reaches the cathode electrode by accompanying proton ($H^+$) generated by the chemical reaction made at the time of power generation.

Fuel consumption accompanying the power generation reaction will be described as follows.

A reaction formula of the DMFC is expressed as follows.

$CH_3OH+H_2O \rightarrow CO_2+6H^++6e^-$      Anode electrode $3/2O_2+6H^++6e^- \rightarrow 3H_2O$      Cathode electrode In theory, methanol and water in the fuel tank react at a molar ratio of 1:1. The methanol concentration is about 64 w %.

In the case of the crossover phenomenon, methanol and water passes through the electrolyte membrane and moves from the anode side to the cathode side. As the methanol concentration at the anode side becomes higher, the crossover amount of methanol per unit time increases. Naturally, the crossover amount of methanol increases with time. The crossover amount of water similarly increases with time. The methanol decreases due to the crossover in proportion to the methanol concentration at the anode side and with time. Those values are determined by a physical property value of the MEA.

The volatilization of methanol and water does not occur if it is possible that the fuel tank is sealed. However if the fuel tank is sealed, carbon dioxide generated in association with power generation reaction of the fuel cell is accumulated in the fuel tank, and carbon dioxide babbles adhere all over one surface side (which faces to the fuel tank) of the anode electrode, so that power generation stops. In the embodiment, consequently, a vapor-liquid separation hole (not shown) must be formed in the fuel tank to exhaust carbon dioxide from the fuel tank.

The vapor-liquid separation hole is a hole having the function of allowing gas to pass through and not allowing liquid to pass through (vapor-liquid separation function). In the embodiment, a porous material is used as the vapor-liquid separation hole and is applied to the hole formed in the fuel tank. The inner wall of the hole is made water-repellent, thereby realizing the vapor-liquid separation function.

Methanol and water volatilizes through the vapor-liquid separation hole, thereby varying methanol concentration.

As described above, the accompanying water accompanies protons, moves to the cathode side, and is consumed. Consequently, the accompanying water increases/decreases in proportion to the quantity of electrons ($e^-$), that is, the current amount and time.

Specifically, when the current amount is decreased, the amount of water that moves concomitantly with protons decreases, and the amount of water accumulated in the fuel tank is maintain with almost no decrease, so that the methanol concentration decreases with time. On the contrary, when the current amount is increased, the amount of water that passes through the electrolyte membrane concomitantly with protons increases, and the amount of water accumulated in the fuel tank decreases, so that the methanol concentration increases.

The mass balance at which methanol and water react with each other varies in accordance with consumption of methanol and water by the crossover, accompanying water, and volatilization. Therefore the amount of water more than the theoretical value of the ratio between methanol and water necessary around the power generation section is needed. A methanol concentration of about 10 to 40 wt % is considered to be optimum. The optimum concentration determined by the physical property of the MEA is called a predetermined concentration in this case, but it is widely a fuel concentration which is determined in advance from various factors. The various factors include a crossover amount at the MEA, and an amount of volatilization of the methanol solution from the liquid-vapor separator.

In the embodiment, the phenomenon such that the amount of the accompanying water depends on the current amount is used. When the methanol concentration in the fuel tank 4 is higher than a predetermined concentration, the accompanying water is decreased by decreasing the amount of current taken from the DMFC, thereby the concentration In the fuel tank is decreased. On the other hand, in the case where the methanol concentration in the fuel tank 4 is lower than the predetermined concentration, the accompanying water is increased by increasing the amount of current taken from the DMFC, thereby making the methanol concentration close to the predetermined concentration.

The methanol concentration in the fuel tank is not always uniform. On the other hand, in the fuel solution of the fuel tank, the methanol concentration which is effective to the power generation reaction is in the vicinity of the power generation section. Therefore, it is preferable to sense (measure) the methanol concentration in the vicinity of the power generation section at the time of controlling the methanol concentration. However, there are cases that it is difficult to sense the concentration in the vicinity of the power generation section depending on the type of the concentration sensor and the structure of a power supply unit. In this case, the concentration at a location that is not necessarily in the vicinity of the power generation section may be sensed by calibrating the sensed concentration, thereby estimating the concentration in the vicinity of the power generator.

In this invention, the concentration sensing device includes the concentration estimating device in addition to the concentration sensor. The concentration sensing device will be described.

It is also possible to provide two flat plates in the fuel tank 4 and sense the concentration from dielectric constant between the flat plates. Since the dielectric constant of water is 88.15 and the dielectric constant of methanol is 32.6, the methanol concentration between the flat plates can be sensed by calculation from the dielectric constant between the flat plates.

Alternatively, a methanol sensor using a change in sound velocity or a change in index of refraction of light may be used.

Further, a method of estimating methanol concentration instead of directly measuring methanol concentration may be used. For example, when the methanol concentration in the fuel tank increases, an output of the DMFC decreases in spite of the fact that the temperature of the DMFC becomes high, and the temperature increases, so that the methanol concentration can be easily estimated by such a phenomenon. When the concentration in the fuel tank in the DMFC decreases, the drop in temperature is large in spite of the fact that an output of the DMFC is in a normal range with respect to the temperature of the DMFC. Consequently, the concentration can be easily estimated by such a phenomenon.

In the case where the user does not use a fuel cell-power supply unit for a long period, the fuel on the anode side penetrates to the cathode side and is dried since the membrane electrode assembly (MEA) in the power generation section of the DMFC is a semitransparent membrane, and the fuel tank may become empty. After that, when a new fuel is replenished into a cartridge at the time of reuse, the methanol concentration of the fuel tank becomes equal to the fuel concentration of the cartridge. Generally, a fuel concentration range in which the DMFC can generate power (generally, less than about 20 wt %) in good condition is lower than the cartridge methanol concentration necessary for continuous operation (the theoretical value is 64 wt % since equal moles of methanol and water are necessary). Therefore, if the methanol concentration of the fuel tank becomes equal to the fuel concentration of the cartridge, on start of use, abnormal heat generation occurs due to drop in an output caused by feeding a high-density fuel and crossover of methanol. In addition, shortening of life of the power generation section in the DMFC may occur. It is consequently necessary to devise prevention of increase in the concentration of the fuel tank on start of use, as follows.

In the configuration, the cartridge 6 has a fuel push mechanism (piston 9 and spring 10), and the fuel is fed only by the amount of the fuel used in the auxiliary tank 8 and the fuel tank 4. When the electronic equipment with the fuel cell power supply unit is not used, the user detaches the cartridge 6 from the fuel cell power supply unit. When the equipment is put in storage, an output of the DMFC is almost zero. However, methanol is consumed by the crossover, so that the methanol concentration in the auxiliary tank 8 and the fuel tank 4 becomes almost 0% after long time. After that, water goes out from the electrolyte membrane of the power generation unit 11 in the DMFC, and the fuel tank 4 becomes empty. However, the fuel in the auxiliary tank 8 is not in contact with the electrolyte membrane, so that drying of the auxiliary can be prevented. To realize such an effect, it is desirable that the fuel passage between the fuel tank 4 and the auxiliary tank 8 be as narrow as possible. If the fuel passage is narrow, consumption of the fuel in the auxiliary tank 8 is suppressed. When the cartridge 6 is attached at the time of reuse, the fuel once diluted in the auxiliary tank 8 is fed to the fuel tank 4, so that heat generation caused by high-density fuel can be prevented.

Figure 6:
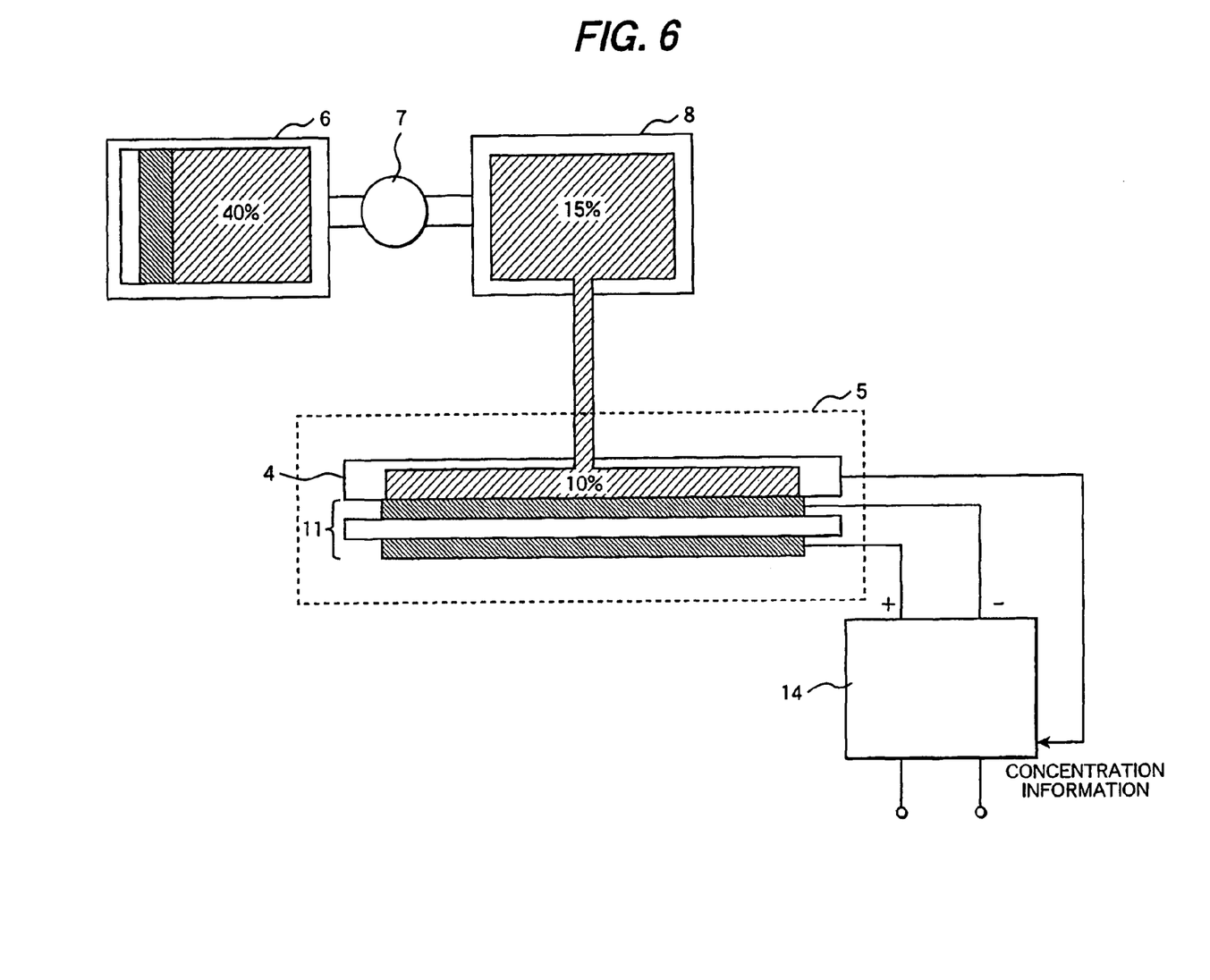
FIG. 6 is a drawing showing a state of tanks after activation in the first embodiment of the invention.

FIG. 6 shows an example of designing for realizing the configuration. In the case of parameters where fuel cartridge concentration is 40%, the upper limit concentration in the fuel tank is 20%, and the capacity of the fuel tank is 1 cc, the capacity of the auxiliary tank has to be 1 cc or more. In the case where the optimum concentration in the fuel tank is 10% and an initial value is desired to be adjusted to the concentration, the capacity of the auxiliary tank has to be 3 cc or more. The ratio between the fuel capacity of the auxiliary tank and the fuel capacity of the fuel tank is preferably at most one tenth of the fuel concentration in the cartridge. When the cartridge check valve 7 is opened in a state where there is no fuel in the fuel tank 4 after long-period storage, the fuel is once diluted in the auxiliary tank 8 and the concentration of the fuel is lowered. After that, the resultant fuel is introduced to the fuel tank 4, so that a trouble such as abnormal power generation due to a high-density fuel does not occur.

Figure 2:
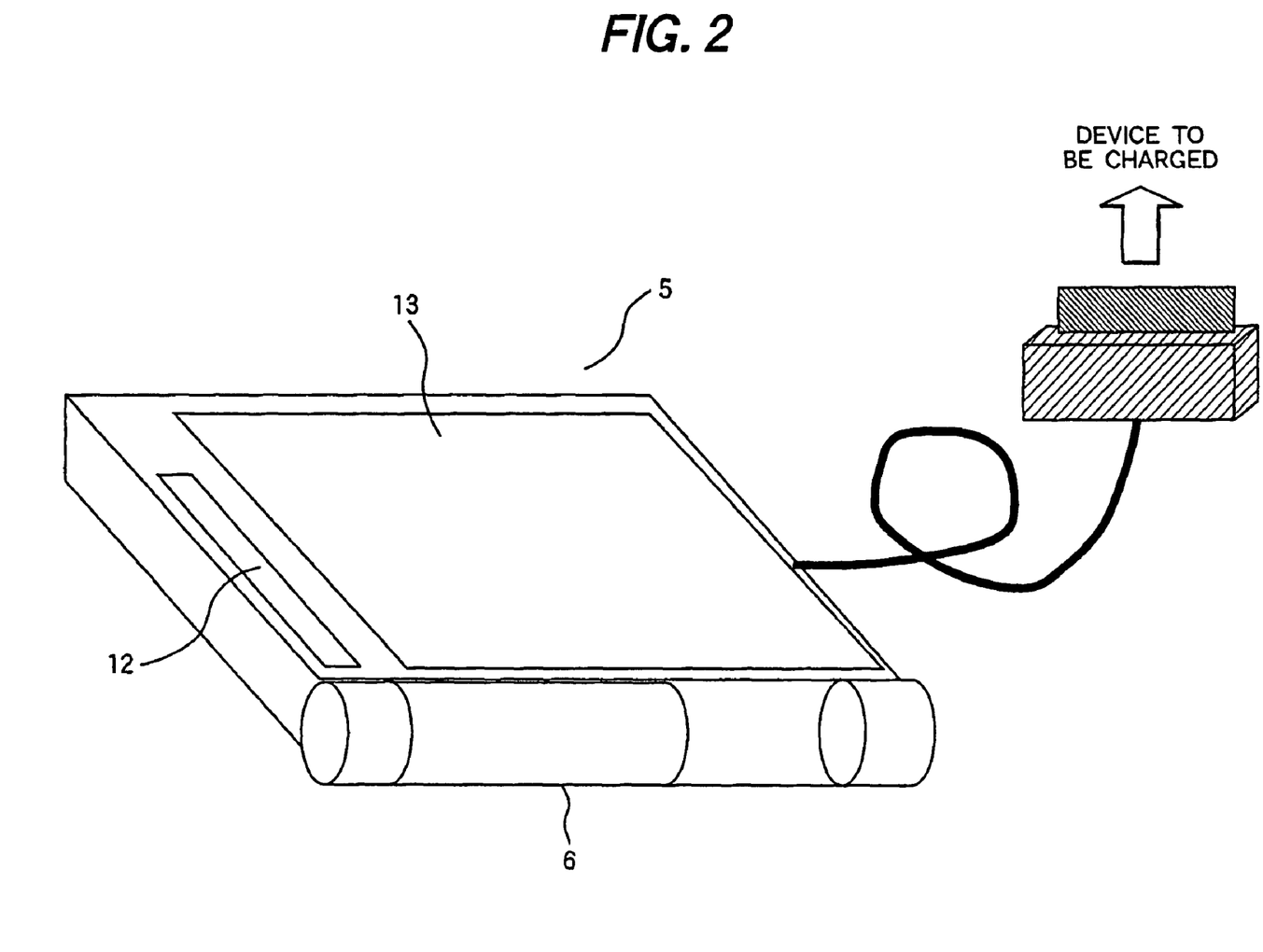
FIG. 2 is an outside drawing of the case where the configuration of the invention is applied to a charger.

FIG. 2 is an outside drawing showing the case where the configuration is used for a charger. The case relates to a mode of using the charger in a state where the fuel cartridge 6 remains attached. Via a cathode side-mesh structure 13, air (oxygen) is introduced into the cathode electrode.

By providing an observation window 12 for observing a remaining fuel amount in the auxiliary tank, the user can observe whether the auxiliary tank 8 is empty or not. With such a configuration, it can prevent an occurrence of an accident that the user attaches the normal cartridge 6 in spite of the fact that auxiliary tank 8 is empty in the DMFC 5. Consequently, an occurrence of abnormal heat generation is prevented. For normal reset from the state where the auxiliary tank 8 is empty, a reset cartridge filled with a fuel of optimum concentration is prepared in addition to the normal fuel cartridge. The reset cartridge is filled with a fuel having a concentration lower than that in the normal fuel cartridge, thereby reducing the probability of occurrence of abnormal heat generation or the like.

Figure 3:
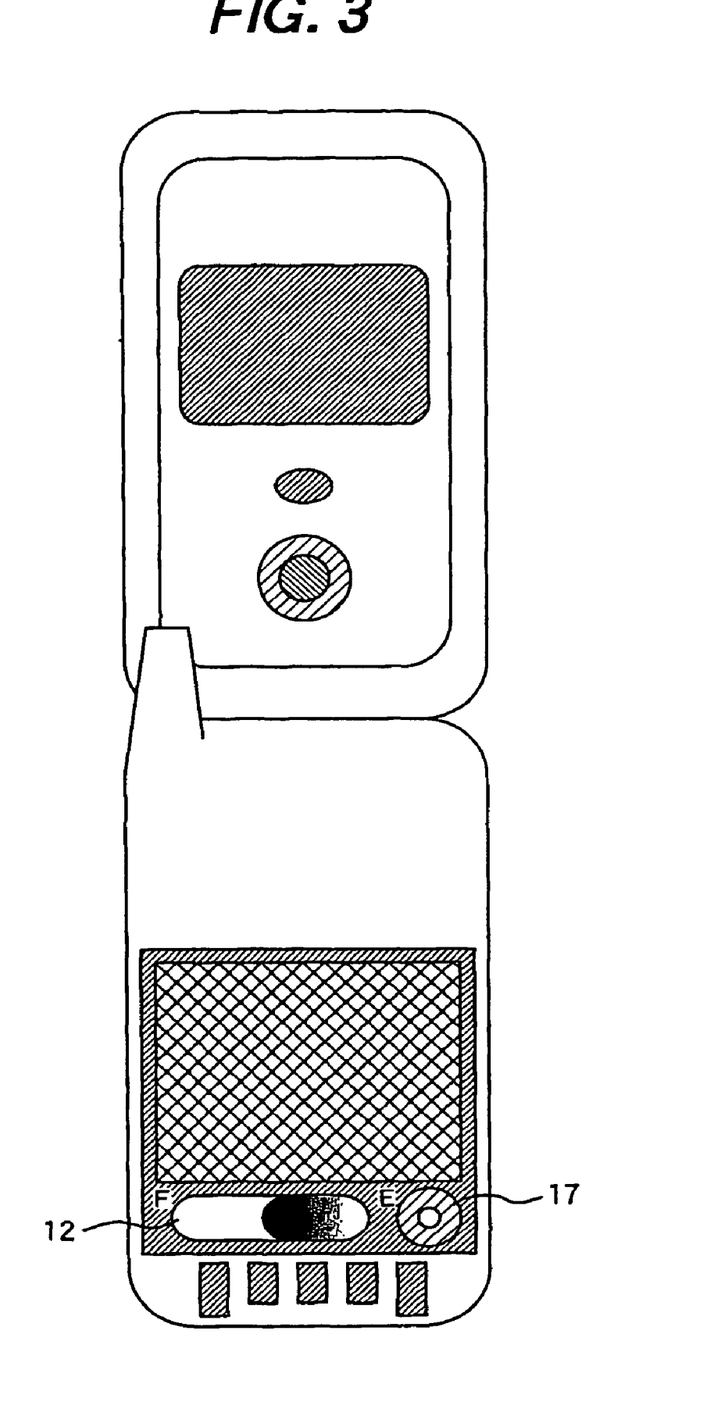
FIG. 3 is an outside drawing of the case where the configuration of the invention is applied to a battery for a cellular phone.

FIG. 3 is an outside drawing showing the case of using the configuration as a cellular phone-power supply. A mode of using the fuel cartridge 6 only at the time of replenishment is assumed, and the fuel cartridge 6 can be inserted in a replenishment cartridge insertion port 17. With such a configuration, miniaturization the cellular phone can be realized. By providing the observation window 12 for observing the remaining fuel amount in auxiliary tank, the user can observe whether the fuel has to be replenished or not.

The details of the control system 14 will be described by using drawings.

In the control system, when controlling (adjusting) the fuel concentration in the fuel tank during use of the electric equipment with the fuel cell power supply unit, a power taken from the DMFC is increased or decreased. In this case, the power does not match a request of a load. In order to meet with the problem, a capacitor 15 for correcting discrepancy between the load and the power of the DMFC is provided.

Figure 7:
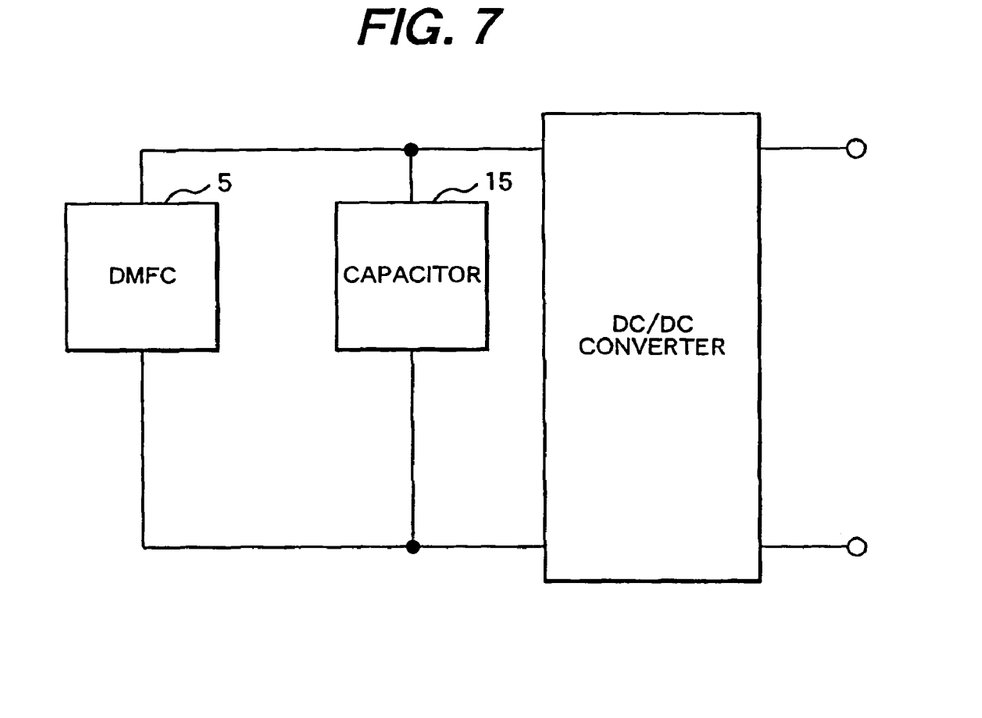
FIG. 7 shows an example in which a capacitor is connected to the input side of a DC/DC converter.

FIG. 7 shows an example of connecting the capacitor 15 to the input side of a DC/DC converter. In the case where the DC/DC converter is of a boosting type, the withstand voltage of the capacitor 15 can be lowered.

Figure 8:
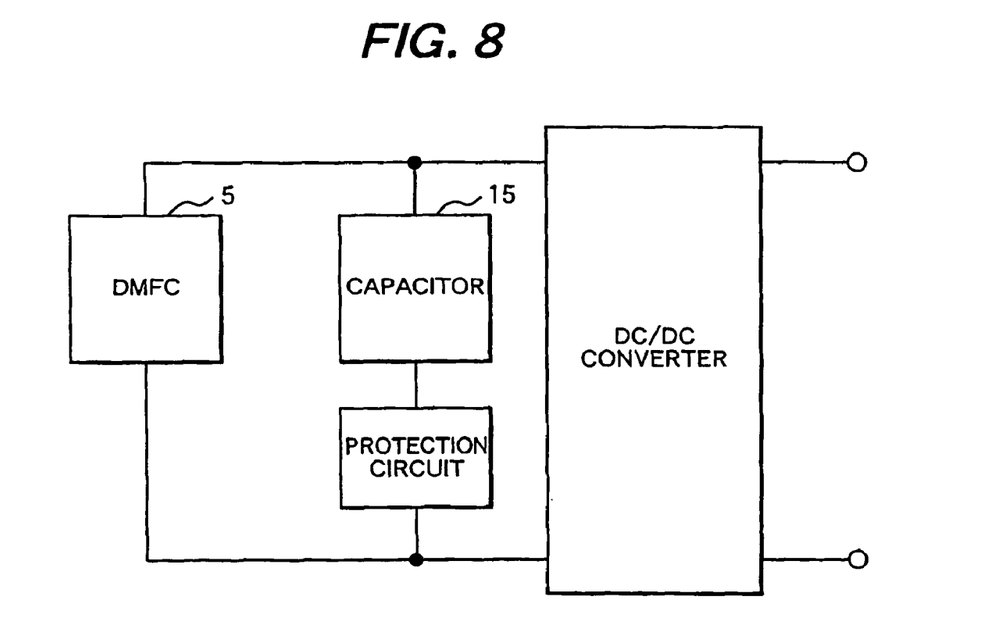
FIG. 8 shows an example in which a protection circuit is added.

FIG. 8 shows another configuration instead of FIG. 7. In the case where the capacitor 15 is a lithium battery or the like, it is necessary to protect charging and discharging, so that a protection circuit is added.

Figure 9:
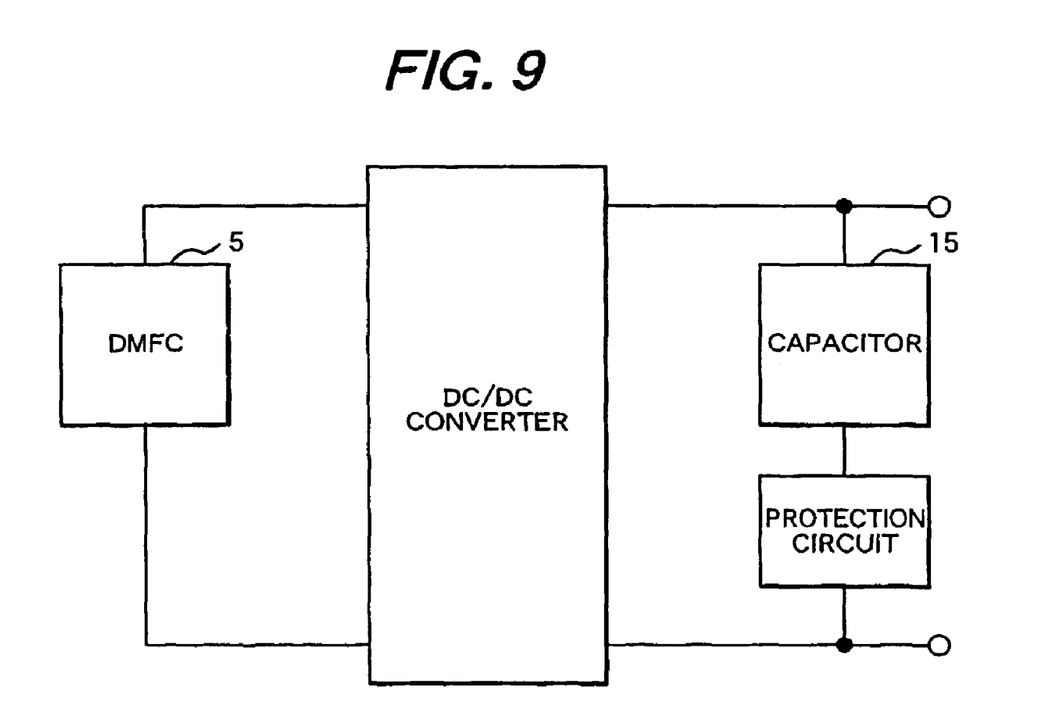
FIG. 9 shows an example in which a capacitor is connected to the output side of the DC/DC converter.

FIG. 9 shows an example in which the capacitor 15 is connected to the output side of the DC/DC converter. As compared with the configurations of FIGS. 7 and 8, an output of the DMFC can be controlled more easily independently of the capacitor 15.

Figure 10:
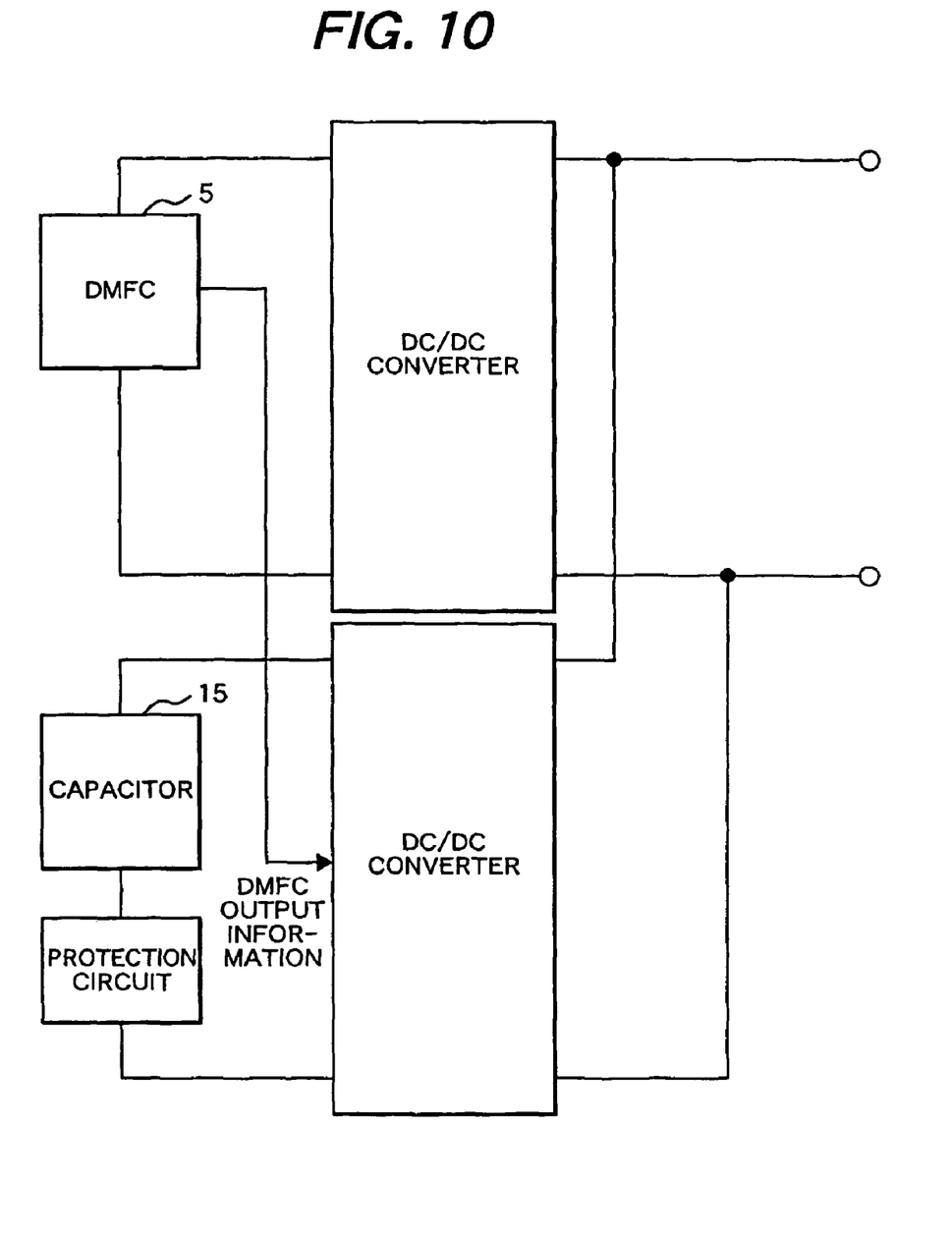
FIG. 10 shows the configuration in which a DMFC and a capacitor are controlled by another DC/DC converter.

FIG. 10 shows a configuration of controlling the DMFC and the capacitor 15 by another DC/DC converter. By using a charging/discharging type DC/DC converter on the side of the capacitor, while lowering the withstand voltage of the capacitor, an output of the DMFC and an output of the capacitor 15 can be controlled independently of each other.

Second Embodiment

Figure 4:
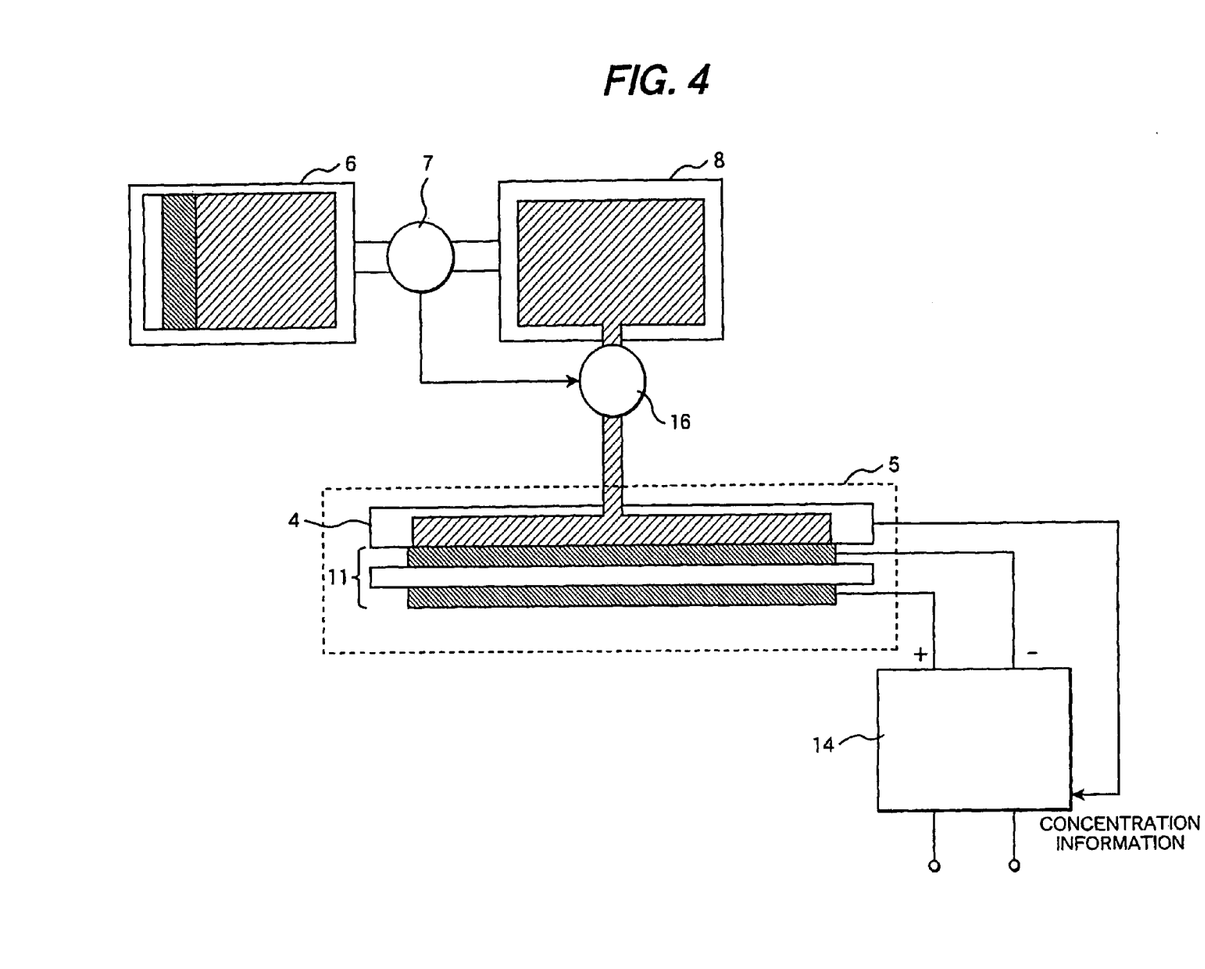
FIG. 4 shows the configuration in a second embodiment of the invention.

A second embodiment of the invention will be described with reference to FIG. 4.

The second embodiment is characterized by providing a check valve 16 for the auxiliary tank 8 in addition to the first embodiment.

The auxiliary tank-check valve 16 opens when the fuel cartridge 6 is attached and closes when the fuel cartridge 6 is detached. When the user does not use the electric equipment for a long time, or when the equipment is stored for long time the fuel cartridge 6 is detached from the power supply unit. Thereby the auxiliary tank 8 is completely sealed by the cartridge check valve 7 and the auxiliary tank check valve 16. Consequently, the fuel in the auxiliary tank 8 can be prevented from being air-dried more than the configuration of the first embodiment.

Third Embodiment

Figure 5:
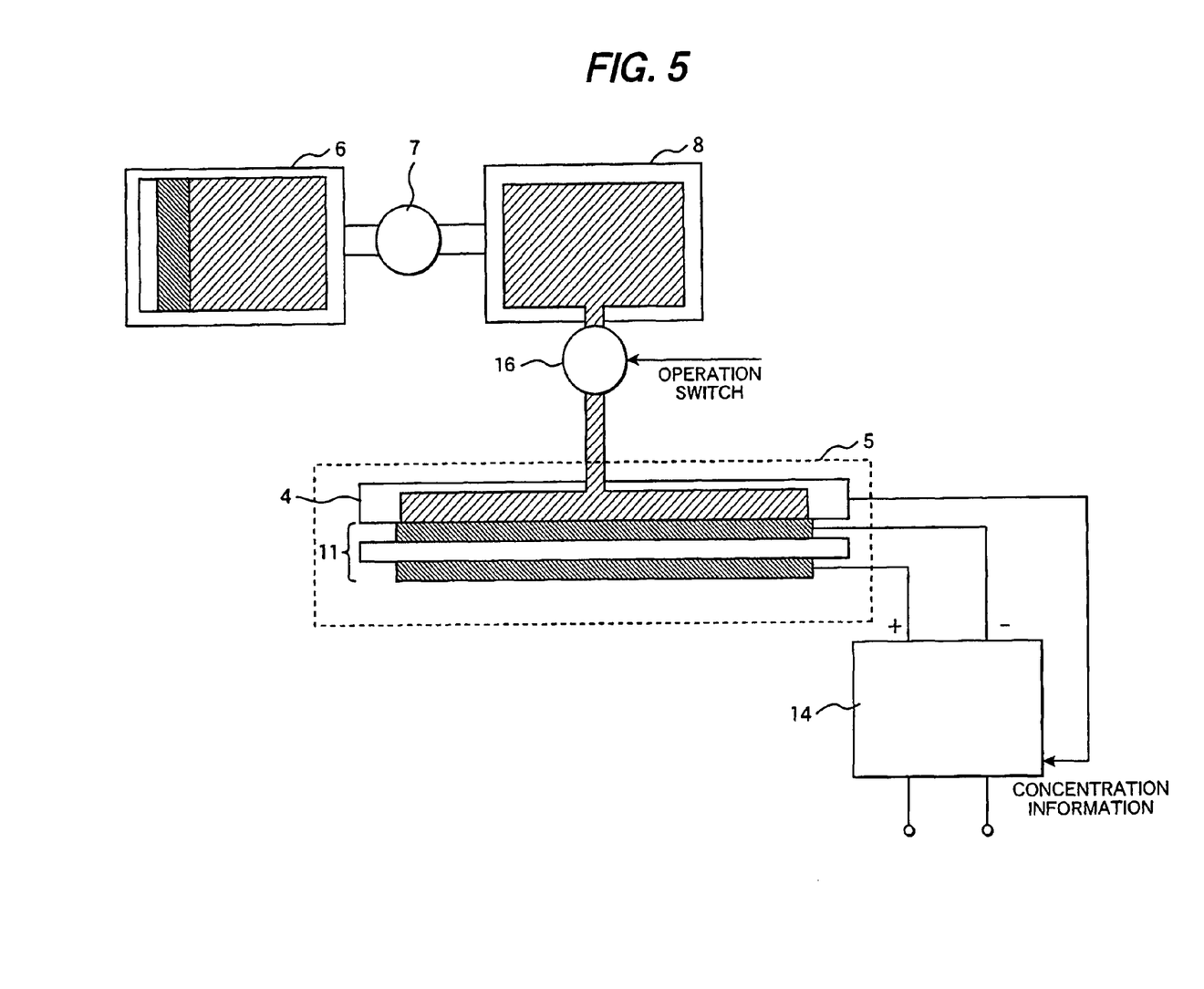
FIG. 5 shows the configuration in a third embodiment of the invention.

A third embodiment of the invention will be described with reference to FIG. 5.

The third embodiment is characterized in that the auxiliary tank-check valve 16 of the second embodiment is controlled by another method.

In the configuration of the third embodiment, an operation switch with which the user can select whether the power supply unit can be used or not is provided. The auxiliary tank-check valve 16 opens when the operation switch is ON (namely select use of the power supply unit) and closes when the operation switch is OFF (namely select non-use of the power supply unit). Like the configuration of the second embodiment, the power supply unit can be stored for long time in a state where the fuel cartridge 6 is attached. When storing the power supply unit, obviously, the auxiliary tank-check valve 16 may be also closed by the operation switch. In a manner similar to the second embodiment, the fuel in the auxiliary tank 8 can be prevented from being air-dried also in the case where the power supply unit is stored for long time.

Although three embodiments have been described above, obviously, some of the embodiments can be combined and used according to an application.

What is claimed is:

1. Electronic equipment with a fuel cell-power supply unit comprising:
   a power generation section including a passive fuel cell with an anode electrode for oxidizing a fuel, a cathode electrode for reducing oxygen and a solid polymer electrolyte membrane provided between the anode electrode and the cathode electrode;
   a fuel tank for feeding the fuel in a solution state to the anode electrode;
   a concentration sensing device for sensing a concentration of the fuel in the solution; and
   a controller configured to obtain information from the concentration sensing device and controlling current taken from the fuel cell-power supply unit so as to decrease an amount of the current taken from the fuel cell-power supply unit when the concentration of the fuel in the solution is higher than a predetermined value, and to increase an amount of the current taken from the fuel cell-power supply unit when the concentration of the fuel in the solution is lower than the predetermined value.

2. The electronic equipment according to claim 1, wherein a capacitor is provided in addition to the fuel cell-power supply unit, and discrepancy between a power from the fuel cell-power supply unit and a power required from a load is corrected by using the capacitor during control of the concentration of the fuel in the solution.

3. The electronic equipment according to claim 1, wherein the concentration sensing device uses at least information of temperature in the vicinity of the power generation section of the fuel cell-power supply unit and information of power taken from the fuel cell-power supply unit in order to estimating the fuel concentration in vicinity of the power generating section.

4. The electronic equipment according to claim 1, wherein
   the fuel tank is in contact with the power generation section of the fuel cell-power supply unit and capable of storing fuel, and the equipment further comprising:
   a cartridge capable of replenishing a fuel to the fuel tank, and
   an auxiliary tank capable of storing a fuel, the auxiliary tank being provided in a fuel passage between the cartridge and the fuel tank.

5. The electronic equipment according to claim 4, wherein the fuel capacity of the auxiliary tank is equal to or greater than that of the fuel tank.

6. The electronic equipment according to claim 5, wherein the fuel capacity of the auxiliary tank is at most three times as large as that of the fuel tank.

7. The electronic equipment according to claim 5, wherein the ratio between the fuel capacity of the auxiliary tank and the fuel capacity of the fuel tank is at most one tenth of the fuel concentration in the cartridge.

8. The electronic equipment according to claim 4, further comprising:
   a first check valve for checking backflow to the cartridge, provided in the fuel passage from the cartridge to the auxiliary tank; and
   a second check valve for checking backflow to the auxiliary tank, provided in the fuel passage from the auxiliary tank to the fuel tank.

9. The electronic equipment according to claim 8, wherein the second check valve is opened in response to attachment of the cartridge and is closed in response to detachment of the cartridge.

10. The electronic equipment according to claim 9, wherein a switch function capable of selecting whether power can be generated or not is provided, and the second check valve is opened/closed interlockingly with a switch input.

11. The electronic equipment according to claim 1, wherein the passive fuel cell does not have an auxiliary device which actively controls the flow of fuel in the solution from the fuel tank to the fuel cell.

12. The electronic equipment according to claim 1, wherein the controller for the passive fuel cell is configured to control the fuel concentration at the anode electrode without controlling the flow of fuel in the solution from the fuel tank to the anode electrode.

* * * * *

UNITED STATES PATENT AND TRADEMARK OFFICE
CERTIFICATE OF CORRECTION

| | |
|---|---|
| PATENT NO. | : 7,977,001 B2 |
| APPLICATION NO. | : 11/514929 |
| DATED | : July 12, 2011 |
| INVENTOR(S) | : Norimatsu et al. |

Page 1 of 1

It is certified that error appears in the above-identified patent and that said Letters Patent is hereby corrected as shown below:

Title Pg, Item (75) Inventors: 3rd inventor should read -- Matsumi Kikuchi, Mito (JP) --.

Signed and Sealed this
Twenty-seventh Day of September, 2011

David J. Kappos
*Director of the United States Patent and Trademark Office*